United States Patent
Jung

(10) Patent No.: US 9,365,191 B2
(45) Date of Patent: Jun. 14, 2016

(54) TIRE INFLATOR OF A VEHICLE

(71) Applicant: HYUNDAI MOBIS CO., LTD., Seoul (KR)

(72) Inventor: Joon-Chai Jung, Anyang-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 72 days.

(21) Appl. No.: 14/306,812

(22) Filed: Jun. 17, 2014

(65) Prior Publication Data

US 2015/0306923 A1 Oct. 29, 2015

(30) Foreign Application Priority Data

Apr. 23, 2014 (KR) ........................ 10-2014-0048558

(51) Int. Cl.
*B60S 5/04* (2006.01)
*B60C 23/10* (2006.01)

(52) U.S. Cl.
CPC *B60S 5/046* (2013.01); *B60C 23/10* (2013.01)

(58) Field of Classification Search
CPC ........ B60C 23/003; B60C 23/14; B60C 23/10
USPC ......................................... 152/416, 415, 417
See application file for complete search history.

(56) References Cited

U.S. PATENT DOCUMENTS

| 4,582,108 | A | * | 4/1986 | Markow | ................ | B60C 23/004 |
| | | | | | | 152/418 |
| 4,797,895 | A | * | 1/1989 | Kokubo | .............. | H01S 5/02248 |
| | | | | | | 250/205 |
| 5,307,674 | A | * | 5/1994 | Forti | ....................... | B60S 5/043 |
| | | | | | | 137/229 |
| 5,730,177 | A | * | 3/1998 | Kim | ........................ | B60C 23/14 |
| | | | | | | 152/416 |
| 6,144,295 | A | * | 11/2000 | Adams | .................. | B60C 23/003 |
| | | | | | | 137/224 |
| 6,336,481 | B1 | * | 1/2002 | Tigges | ................. | B60C 23/003 |
| | | | | | | 152/415 |
| 6,729,363 | B2 | * | 5/2004 | Stiller | ..................... | B60C 23/14 |
| | | | | | | 141/100 |
| 2011/0100480 | A1 | * | 5/2011 | Huang | .................... | B60S 5/046 |
| | | | | | | 137/227 |
| 2013/0228316 | A1 | * | 9/2013 | Hong | .................... | F04B 39/066 |
| | | | | | | 165/121 |

FOREIGN PATENT DOCUMENTS

| JP | 2011-011624 A | 1/2011 |
| JP | 2013-028251 A | 2/2013 |
| KR | 10-1997-0064991 A | 10/1997 |
| KR | 10-2002-0044961 A | 6/2002 |

* cited by examiner

*Primary Examiner* — Hau Phan
(74) *Attorney, Agent, or Firm* — Knobbe, Martens, Olson & Bear, LLP

(57) ABSTRACT

An inflator 300 for pumping compressed air supplied from a compressor 200 provided in a motor vehicle into a tire mounted to the motor vehicle, the inflator may include: an inflator port L6 to which compressed air supplied from the compressor 200 is entered; a control unit 320 provided with a pressure switch 321 which is actuated according to an internal pressure of the inflator port L6; and a supplying unit 310 coupled detachably with the inflator port L6 for pumping compressed air into the tire, wherein the control unit 320 is equipped with an ON/OFF switch 322 transmitting a signal to electronic control unit E according to an operation of the pressure switch 321.

12 Claims, 3 Drawing Sheets

TIRE INFLATOR OF A VEHICLE

CROSS-REFERENCE(S) TO RELATED APPLICATIONS

This application claims priority to Korean Patent Application No. 10-2014-0048558, filed on Apr. 23, 2014, which is incorporated herein by reference in its entirety.

BACKGROUND

1. Field

Exemplary embodiments of the present invention relate to an inflator of a vehicle.

2. Description of Related Art

For safe travelling of a motor vehicle, a tire internal pressure should be maintained at a proper pressure. If the tire internal pressure is excessive, a wear is concentrated on a central portion of a tire tread which is in contact with a road surface so that the tire can be damaged during travelling of the motor vehicle. On the contrary, if the tire internal pressure is insufficient, an area of the tire tread which is in contact with a road surface is unnecessarily widened so that a running performance of the motor vehicle is deteriorated and a side portion of the tire can be damaged.

Therefore, a technology for checking a tire internal pressure has been developed, and the above technology is called as a tire pressure monitoring system (TPMS). The TPMS is the technology which measures the tire air pressure and generates an alarm when the measured air pressure is less than the preset reference air pressure, and notifies a driver that the tire air pressure is less than the preset reference air pressure.

However, since the TPMS only measures a tire internal pressure, compares the measured tire internal pressure with the reference value and notifies a driver of a comparing result, even if the tire internal pressure less than the reference value is measured, a driver cannot take immediate measures such as supplying compressed air to the tire and the like.

Thus, a device being capable of supplying compressed air to the tire when the tire internal pressure less than the reference value is measured, has been required.

An inflator is a device for pumping air into the tire, and a compressor generating compressed air is required for operating the inflator.

By the way, the motor vehicle to which an air suspension is mounted is equipped with a compressor for supplying compressed air to the air suspension.

If the inflator is mounted to the motor vehicle to which the air suspension is installed and compressed air is supplied to the inflator by means of the compressor, it is expected that the inflator can pump immediately compressed air into the tire when the tire internal pressure is measured as the value less than a reference value, an entire weight is reduced and a manufacturing cost is saved.

SUMMARY

An aspect of the present invention invented in view of the above is to provide a tire-inflator mounted to a motor vehicle, which can supply immediately compressed air into a tire when a tire internal pressure is measured as a value less than a reference value.

One aspect of the invention provides an inflator for pumping compressed air supplied from a compressor provided in a motor vehicle into a tire mounted to the motor vehicle, according to one aspect of the present invention comprises an inflator port to which compressed air supplied from the compressor is entered; a control unit provided with a pressure switch which is operated according to an internal pressure of the inflator port; and a supplying unit coupled detachably with the inflator port for pumping compressed air into the tire. Herein, the control unit is equipped with an ON/OFF switch transmitting a signal to electronic control unit according to an operation of the pressure switch.

In accordance with another aspect of the present invention, the inflator may further include a relief valve for maintaining the internal pressure in the inflator port within a range so that the tire is not demolished.

In accordance of yet another aspect of the present invention, a compressing device for compressing air, an inhaling passage extended to one side of the compressing device and a supplying passage for supplying compressed air to the air suspension and the inflator may be formed on the compressor, and the supplying passage may be branched into a suspension passage connected to the air suspension, an inflator passage connected to the inflator and a reducing passage connected to the inhaling passage to discharge excessive compressed air to an outside. In addition, the inflator passage is provided with a cock valve, and the inflator port provided in the inflator may be coupled with the cock valve to connect the inflator passage and the inflator port to each other. Furthermore, when the pressure switch is actuated, the compressing device may be operated to constantly maintain air pressure in the supplying passage, the ON/OFF switch may be a magnetic switch.

In accordance of further another aspect of the present invention, the supplying unit comprises an air-pressure gage measuring a magnitude of compressed air entered through the inflator port and a stop valve selectively communicating the tire with the inflator port.

DESCRIPTION OF EMBODIMENTS

Figure 1:
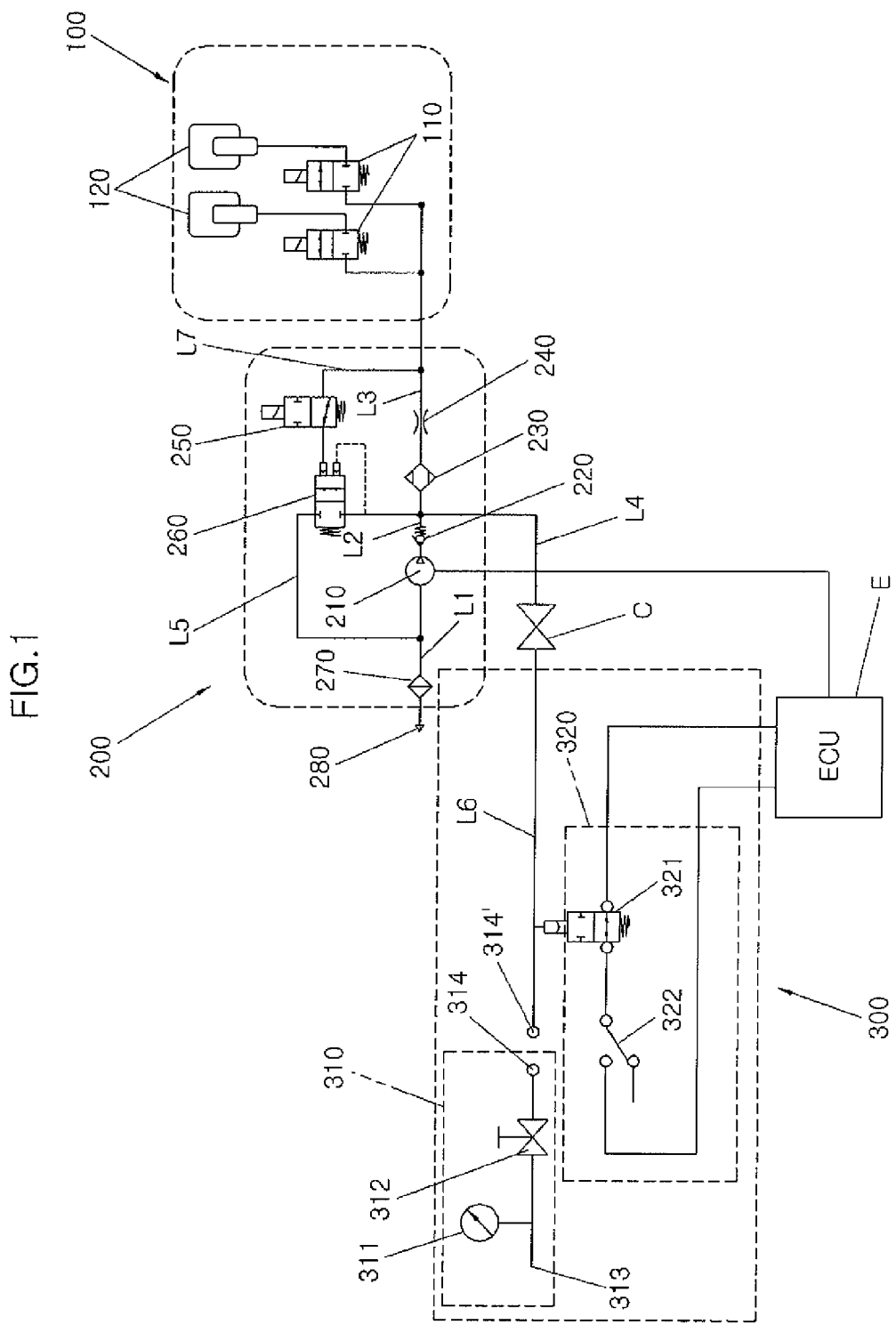
FIG. 1 is a schematic view of a tire-inflator mounted to a motor vehicle in accordance with one embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Figure 2:
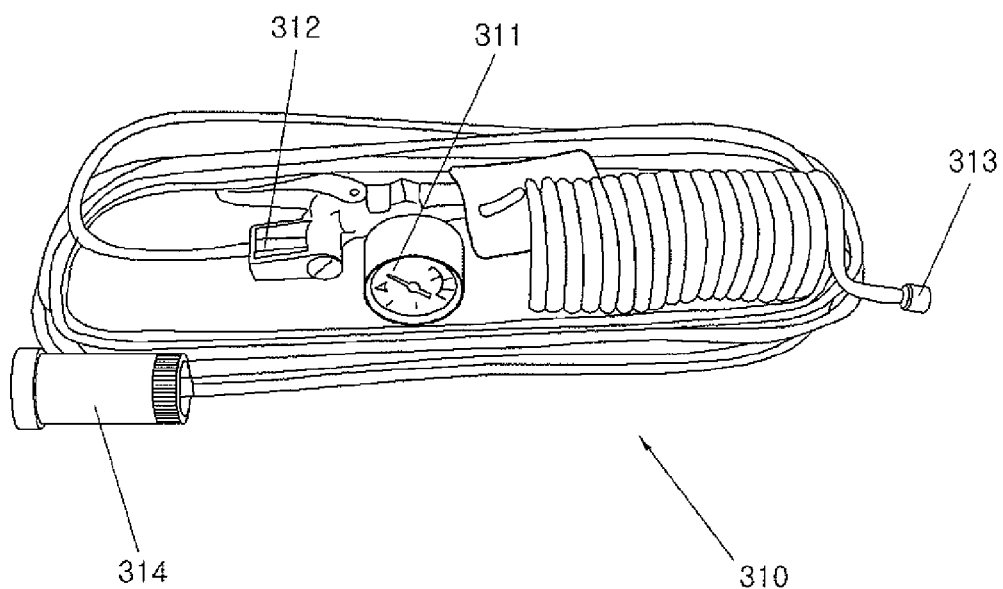
FIG. 2 is a perspective view of a supplying unit provided in a tire-inflator mounted to a motor vehicle, shown in FIG. 1.
Figure 3:
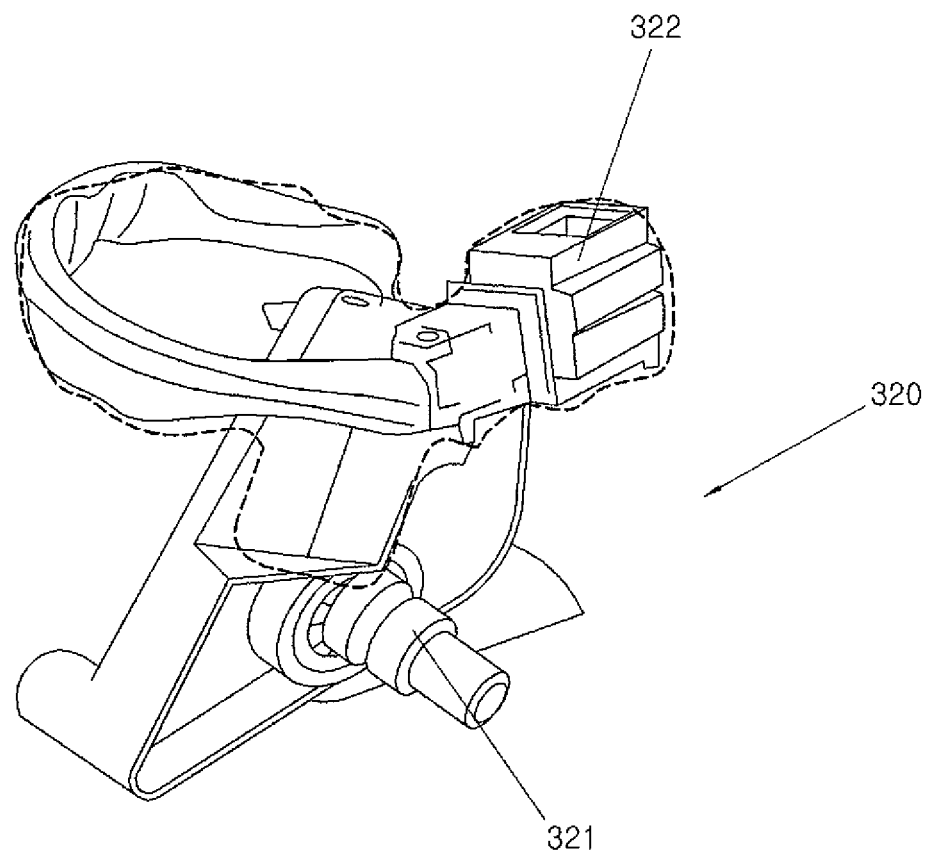
FIG. 3 is a perspective view of a control unit provided in a tire-inflator mounted to a motor vehicle, shown in FIG. 1.

FIG. 1 is a schematic view of a tire-inflator mounted to a motor vehicle in accordance with one embodiment of the present invention, FIG. 2 is a perspective view of a supplying unit provided in a tire-inflator mounted to a motor vehicle, shown in FIG. 1, and FIG. 3 is a perspective view of a control unit provided in a tire-inflator mounted to a motor vehicle, shown in FIG. 1.

As shown in FIG. 1, an inflator 300 according to an embodiment of the present invention for pumping compressed air supplied from a compressor 200 provided in a motor vehicle into a tire mounted to the motor vehicle includes an inflator port L6 to which compressed air supplied from the compressor 200 is entered, a control unit 320 provided with a pressure switch 321 which is actuated according to an internal pressure of the inflator port L6, and a supplying unit 310 coupled detachably with the inflator port L6 for pumping compressed air into the tire.

The control unit 320 is equipped with an ON/OFF switch 322 transmitting a signal to electronic control unit E according to an operation of the pressure switch 321.

In addition, an embodiment of the present invention is characterized in that the compressor 200 supplies compressed air to an air suspension 100 provided in the motor vehicle and an internal pressure of the inflator port L6 is maintained at the value which is larger than an upper value. Thus, the internal pressure of inflator port L6 is maintained such that an air is injected into the tire, i.e., a state of exceeding 3.03 bar (common tire's maximum inner pressure; 44 psi)

In one embodiment of the present invention, the pressure switch 321 is actuated when the internal pressure of the inflator port L6 is less than the upper value, that is, below three (3) bars.

Also, the compressor 200 includes a compressing device 210 for compressing air, an inhaling passage L1 extended to one side of the compressing device 210 for enabling the compressing device 210 to inhale external air through an inhaling port 280 formed at an end thereof and a supplying passage L2 for supplying compressed air to the air suspension 100 and the inflator 300.

A filter 270 for filtering dusts contained in air flowing from an outside is provided in the inhaling passage L1 and a check valve 220 is installed in the supplying passage L2 to prevent compressed air from flowing backward.

The supplying passage L2 is branched into a suspension passage L3 connected to the air suspension 100, an inflator passage L4 connected to the inflator 300 and a reducing passage L5 connected to the inhaling passage L1 to discharge excessive compressed air to an outside.

A solenoid valve 110, which is opened when an electric current is applied, is provided on the suspension passage L3, this solenoid valve is actuated to supply air pressure generated in the compressor 200 to an air spring 120 or actuated to discharge air pressure in the air spring 120.

In addition, an air-dryer 230 for drying compressed air supplied to the air spring 120 is provided on the suspension passage L3, and a throttle valve 240 is disposed adjacent to the air-dryer 230 for controlling a flow rate of compressed air supplied to the air spring 120.

A flow control valve 260 is installed on the reducing passage L5, and a control solenoid valve 250 is provided on a control passage L7 branched from the suspension passage L3 for pressurizing the flow control valve 260.

When air pressure of the air suspension 100 is excessive or an adjustment of air pressure of the air suspension is required according to a travelling condition, an operation of the compressing device 210 is halted and a cock valve C provided on the inflator passage L4 is closed. Subsequently, an electric current is applied so that the control solenoid valve 250 is opened.

In addition, compressed air flows from the air spring 120 to the control passage L7 through the suspension passage L3 and compressed air pressurizes the flow control valve 260 through the control solenoid valve 250 which is in an opened state.

As the flow control valve 260 is pressurized, a state of the flow control valve is changed so that the reducing passage L5 is communicated in fluid with the inhaling passage L1. Therefore, compressed air in the air spring 120 is discharged through the reducing passage L5 and the inhaling passage L1.

Since one end of the inflator port L6 provided on the inflator 300 is coupled with the cock valve C, the inflator port L6 is connected to the compressor 200.

The inflator 300 is equipped with the inflator port L6 to which air pressure generated from the compressor 200 is entered, the pressure switch 321 actuated according to an internal pressure of the inflator port L6, the control unit 320 had an ON/OFF switch 322 transmitting the signal to an electronic control unit E provided in the motor vehicle in response to an operation of the pressure switch 321, and the supplying unit 310 coupled detachably with the inflator port L6 to pump compressed air into the tire. The ON/OFF switch 322 is a magnetic switch.

If an internal pressure of the inflator port L6 is less than the upper value, the pressure switch 321 communicates the ON/OFF switch 322 with the electronic control unit E, the electronic control unit E receiving the signal from the ON/OFF switch 322 operates the compressing device 210 to increase an internal pressure of the inflator port L6.

If an internal pressure of the inflator port L6 is increased to a value larger than the upper value, the pressure switch 321 is recovered to its original state. As the pressure switch 321 is recovered to its original state, the signal transmitted from the ON/OFF switch 322 to the electronic control unit E is blocked so that an operation of the compressing device 210 is halted.

Thus, an internal pressure of the inflator port L6 is maintained at the value larger than the upper value, and an internal pressure of the suspension passage L3 branched from the supplying passage L2 and disposed in parallel with the inflator port L6 is also maintained at the value larger than the upper value.

An internal pressure of the entire air pressure passages is constantly maintained by the control unit 320 so that an air pressure storing means for storing air pressure and a pressure sensor for measuring an internal pressure of a pneumatic circuit are unnecessary.

The supplying unit 310 is provided with an air-pressure gage 311 measuring a pressure of compressed air pumped into the tire through the inflator port L6 and a stop valve 312 selectively communicating the tire with the inflator port L6.

A coupling part 314 is formed on one side of the supplying unit 310, and this coupling part is coupled with a coupling part 314' provided at one end of the inflator port L6.

According to the tire-inflator mounted to the motor vehicle in accordance with embodiments of the present invention, since compressed air generated in the compressor employed for supplying compressed air to the air suspension can be pumped into a tire through the inflator, it is possible to pump immediately compressed air into the tire when the tire internal pressure is measured as the value less than a reference value.

In addition, since the pressure switch is provided in the inflator port to maintain constantly an internal pressure of a pneumatic circuit, it is not necessary to provide an air pressure storing means and a pressure sensor for measuring an internal pressure of the pneumatic circuit.

While the present invention has been described with respect to the specific embodiments, it will be apparent to those skilled in the art that various changes and modifications may be made without departing from the spirit and scope of the invention as defined in the following claims.

What is claimed is:

1. An air supplying system in a motor vehicle comprising:
a compressor comprising an air suspension port and a tire inflation port, the air suspension port connected to an air suspension system of the motor vehicle, the tire inflation port connected to a tire inflator;

the tire inflator comprising an inflator port, a pressure switch and an air supplying hose;

the inflator port connected to the tire inflation port of the compressor for receiving compressed air from the compressor;

the pressure switch configured to generate a signal requesting initiation of the compressor when air pressure at the inflator port is lower than a predetermined value; and the air supplying hose with a terminal configured to connect to a tire for supplying compressed air into the tire, wherein the compressor is configured to operate in response to the signal from the pressure switch for supplying compressed air to the tire inflator.

2. The air supplying system of claim 1, wherein the tire inflator further comprises a relief valve for releasing air from the tire inflator.

3. The air supplying system of claim 1, wherein the compressor further comprises a compressing device configured for compressing air and an inhaling passage configured for receiving air from surroundings into the compressing device.

4. The air supplying system of claim 3, wherein the compressor further comprises a pressure release valve configured to discharge excessive compressed air from the compressor, and wherein the compressor further comprises a cock valve installed between the tire inflation port of the compressor and the inflator port of the tire inflator.

5. The air supplying system of claim 4, wherein tire inflator further comprises an ON/OFF switch connected to the pressure switch, wherein the pressure switch is configured to generate the signal when air pressure at the inflator port is lower than the predetermined value while the ON/OFF switch is on.

6. The air supplying system of claim 1, wherein the ON/OFF switch is a magnetic switch.

7. The air supplying system of claim 1, wherein the air supplying hose comprises an air-pressure gauge configured to measure the air pressure at the inflator port and a stop valve configured to control a flow of compressed air through the air supplying hose.

8. A vehicle comprising:

an air suspension;

a compressor comprising an air suspension port and a tire inflation port, the air suspension port connected to the air suspension of the vehicle, the tire inflation port connected to a tire inflator;

the tire inflator comprising an inflator port and an air supplying hose, wherein the inflator port is connected to the tire inflation port of the compressor for receiving compressed air from the compressor;

a pressure detector configured to detect air pressure at the inflator port; and a controller configured to operate the compressor based on the detected air pressure so as to maintain the air pressure at the inflator port above a predetermined value.

9. The vehicle of claim 8, wherein the controller is further configured to maintain the air pressure at the air suspension port above another predetermined value.

10. The vehicle of claim 9, wherein the vehicle does not comprise an additional pressure detector other than the pressure detector connected to the controller and configured to detect the air pressure at the air suspension port.

11. The vehicle of claim 8, wherein the pressure detector comprises a pressure switch connected to the controller and configured to generate a signal requesting initiation of the compressor when air pressure at the inflator port is lower than the predetermined value.

12. The vehicle of claim 8, wherein the air supplying hose of the tire inflator comprises a first port configured to be in fluid communication with the inflator port and an outlet configured to connect to a tire for supplying compressed air into the tire.

\* \* \* \* \*